UNITED STATES PATENT OFFICE.

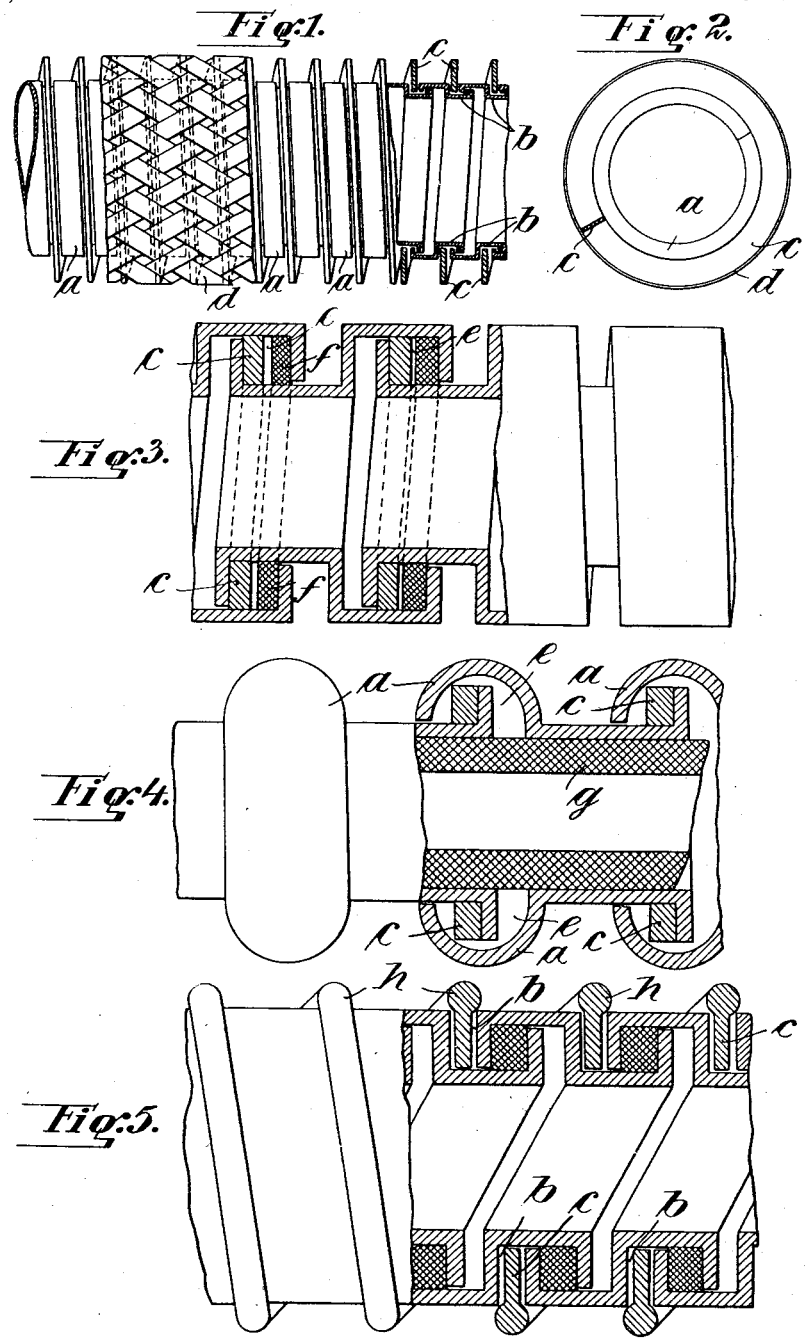

WILHELM GREINER, OF ZWICKAU, GERMANY, ASSIGNOR TO GEBRUDER JACOB, OF ZWICKAU, GERMANY, A FIRM.

METALLIC HOSE WITH GUARD-COIL.

1,181,522.  Specification of Letters Patent.  Patented May 2, 1916.

Application filed November 28, 1913. Serial No. 803,488.

*To all whom it may concern:*

Be it known that I, WILHELM GREINER, a subject of the King of Saxony, residing at 60 Marienthalerstrasse, Zwickau, Saxony, Germany, have invented certain new and useful Improvements in Metallic Hose with Guard-Coil, of which the following is a specification.

The most metallic hose which have become known up to the present day have the disadvantage that they are very sensitive toward outward injuries and do not offer a sufficient resistance against unwinding.

It has been tried to increase the strength of metallic hose by surrounding them either directly or with interposition of one or several wire textures, with a wire coil of a round wire section or with a coil wound of rectangular wire so as to offer a flat surface. By such means the desired strength is not obtained to the full extent desired, because the windings of the coil have too much side play, even if the ends are secured to the hose, and can therefore displace to a considerable degree longitudinally to the hose.

According to the present invention an improvement of these conditions is obtained by the guard coil engaging in the outside grooves of the hose, so that the windings of the coil are prevented from an excessive displacement by the windings of the hose. This arrangement is of particular advantage, when the guard coil is wound as mentioned above of flat wire on the narrow edge. A coil of this kind has a very considerable strength in a radial direction, and is therefore very well adapted to protect the hose against being indented from outside. Its small resistance in its axial direction is favorable for the flexibility of the hose, but allowed with the previously employed methods undesirable displacements of the windings of the guard coil, which disadvantage is avoided by the present invention.

Further constructional forms and advantages of the invention shall hereinafter be more particularly described.

In the accompanying drawing four constructional forms of the new metallic hose are exemplified.

Figure 1 is a side view, partly in section of the one constructional form, the outer covering of fabric being partly shown only. Fig. 2 is an end view of Fig. 1. Fig. 3 is a second constructional form shown in the same manner as in Fig. 1. Fig. 4 is a corresponding illustration of a further constructional form. Fig. 5 is a fourth constructional form.

The metallic hose according to Figs. 1 and 2 is wound in known manner of the profiles $a$ so that between each two neighboring profiles $a$ there is a recess $b$. Into this recess $b$ the flat wire spiral $c$ is wound on its narrow edge, so that the windings of the flat wire spiral have a limited play, but an excessive displacement of these windings is prevented by the profiles $a$. Therefore it is impossible for a wide gap to be formed in the armor produced by the flat wire spiral. The spiral protects the hose both against injuries from outside and against distortion, without impairing its flexibilty.

If a texture of wire or the like $d$ is laid around the thus produced new hose, the strength of the latter is still further considerably increased without its flexibility being materially impaired, in fact more than with the known metallic hose, with which the wire coil is wound directly on the hose profiles. With the new arrangement the windings of the flat wire placed on edge act as distance members so that the whole forms a sort of frame work, the diagonals of which are formed by the windings of the flat wire coil placed on edge. With the latter novel arrangement furthermore a particularly good heat insulation is obtained. When, namely, steam or hot liquids and the like are sent through the hose, the heat can only pass over into the comparatively small section of the narrow windings of the guard coil and very little only into the large air spaces between these windings. By such means the comparatively small amount of heat carried off is distributed over the very large surface of the surrounding wire texture, through the preferably large pores of which besides the atmospheric air can pass and produce a certain cooling effect. Therefore the new hose can be conveniently held in the hand even if a very hot liquid is flowing through it, without any fear of burning the hand or any need of employing a special insulation.

The new metallic hose can be manufactured in a very simple manner by the winding and applying of the flat wire spiral being performed at the same operation as the winding of the hose itself. This method of making the hose is not easily possible with the common guard coils of round wire or flat wire, wound flat, or at least less advantageous, as such spirals have, after their completion, a comparatively large spreading spring, that is to say, they increase their diameter greatly.

With the constructional form according to Figs. 1 and 2 the guard coil is embedded into the open outside grooves of the hose.

In many instances the constructional form as shown in Figs. 3 and 4 respectively will be found more advantageous, where the guard coil is not embedded in the open grooves of the hose, but in the grooves formed by the overlapping of the neighboring windings of the hose, these grooves being covered. These covered grooves are indicated in the drawing by the letter *e*. In them the guard coil *c* lies beside the usual soft packing material *f*. When a flat wire coil wound on edge is used, this arrangement affords a greater safety against displacement. Such a flat wire coil, now, will meet its object of protecting the hose against indenting without impairing the flexibility of the hose the better, the higher and narrower its profile. When the guard coil is placed into the open outside grooves of the hose, there exists the danger, that the windings may be tipped over by forces acting, not in a radial, but in an obliquely axial direction, and that then, in consequence of the thereby produced enlargement of the inside diameter, they are axially displaced on the hose, what the present invention just intends to avoid. This danger is completely avoided when the guard coil is situated, according to Figs. 3 and 4 respectively, in the covered grooves of the hose, and is thus quite inaccessible to the action of oblique axial forces, and only comes into action when radial forces tend to indent the hose.

The embedding of the guard coil in the covered outside grooves of the coil affords, beside the high edge arrangement of the flat wire, a number of further advantages.

With hose which, for rendering them proof against acids and the like, are made of a material proof against corrosion, such as bronze and the like, it would greatly increase the cost, if the guard coil were made of the same expensive, and besides mechanically less strong material. If, however, for such guard coils the usual hard drawn iron or steel wire is employed, the latter will be very soon oxidized by the atmosphere prevailing in chemical works, and the hose would not only soon become unsightly but also dirty in manipulation, whereas the greatest cleanliness is necessary in works manufacturing food stuffs and victuals.

When the guard coil is furthermore embedded in the covered outside grooves of the hose, the latter works more or less noiselessly, as the guard coil which encircles the hose more or less loosely will here and there strike against the soft packing in the same grooves so that even with very jerky operations there will be no clattering or the latter will be damped by the soft packing.

By suitably dimensioning the height of the guard coil it is further possible, as shown in Fig. 3, to obtain the advantage, that the guard coil serves as an additional guide for the hose profiles sliding on each other, and prevents a tilting of the latter which would prevent the free movement. This advantage is not obtained when the guard coil is wound in the open outside grooves of the hose, and thus touches the circumference of the hose with its inside surface only. Lastly when the guard coil is embedded in the covered grooves the hose has a much smoother surface, so that it is impossible to injure oneself on the frequently sharp or burred edges of the flat wire coil.

The constructional form according to Fig. 4 illustrates a hose for compressed air. The rubber tube *g* is surrounded by a metallic hose formed of the known profiles. In the covered outside grooves *e* the flat wire spiral *c* is embedded, which is wound in course of the manufacture.

With the constructional form according to Fig. 5 the guard coil *c* is again placed in the open outside grooves *b* of the metallic hose. The spiral is, however, provided with a thickened beading on its outside edge. Hereby the mechanical strength of the hose against excessive bending strains is greatly increased without the flexibility being impaired, as the mass of material lies just in the outer fiber which is subject to the most dangerous tensile strain under bending stresses. Furthermore the bead on the outside edge of the spiral covers the outside grooves of the hose, so that dirt and grit can less easily penetrate into these grooves and impair the free movement, and besides the appearance of the hose is a more compact and pleasing one. The enlarged bead on the outside edge of the spiral furthermore is in so far of advantage, as it is frequently desirable to keep the outside of the hose cool. As, now, the guard coil is enlarged at its outside edge, the heat conducted by its conductivity from the hose is distributed at its outer surface over a larger area so that the hose remains cooler. Lastly the enlargement will be more convenient in operating the hose, as there are no sharp edges of the coil projecting outward.

I claim:

1. As an article of manufacture, a flexible metallic hose having a flat metallic reinforcing strip wound edgewise thereon with free lateral play.

2. As an article of manufacture, a flexible metallic hose of hard material comprising interfitting metallic profile members forming the wall of the hose, and a flat metallic reinforcing strip wound edgewise between adjacent profile members.

3. As an article of manufacture, a flexible metallic hose having a recessed wall, and a flat metallic reinforcing strip wound edgewise with free lateral play in the recesses in the wall of said hose.

4. As an article of manufacture, a flexible metallic hose comprising overlapping metallic profile members forming covered recesses and constituting the wall of the hose, and a guard coil of flat wire wound on its narrow edge arranged with free lateral play in said covered recesses.

5. As an article of manufacture, a flexible metallic hose having a recessed wall, and a guard coil of flat wire wound on its narrow edge with free lateral play in the recesses in the wall of said hose, and means to prevent entry of dirt between said guard coil and the side faces of said recesses.

6. As an article of manufacture, a flexible metallic hose having an externally recessed metallic wall, a guard coil of flat wire wound on its narrow edge and with free lateral play in the recesses in said wall, and a wire texture with large perforations covering said wire coil.

7. As an article of manufacture, a flexible metallic hose comprising a plurality of interengaging profile members forming a recess at their points of interengagement, and a flat metallic guard strip coiled on its narrow edge in said helical recess.

8. As an article of manufacture, a flexible metallic hose having a flat metallic reinforcing strip wound edgewise thereon with free lateral play, said reinforcing strip being substantially flush with or projecting beyond the outer circumference of said hose.

9. As an article of manufacture, a flexible metallic hose of hard material comprising metallic interfitting profile members forming the wall of the hose, and a flat metallic reinforcing strip wound edgewise between adjacent profile members and substantially flush with or projecting beyond the outer circumference of said hose.

10. As an article of manufacture, a flexible metallic hose having a recessed wall, and a flat metallic reinforcing strip wound edgewise with free lateral play in the wall of said hose, said reinforcing strip being arranged relative to said hose so as to intercept external strains, blows and the like.

In testimony whereof I have hereunto set my hand in the presence of two witnesses.

WILHELM GREINER.

Witnesses:
ALFRED FRIEDRICH,
ROBERT H. NIER.